(12) United States Patent
Sarkar et al.

(10) Patent No.: US 9,128,763 B2
(45) Date of Patent: Sep. 8, 2015

(54) SYSTEM AND METHOD FOR JOB SCHEDULING OPTIMIZATION

(75) Inventors: Santonu Sarkar, Bangalore (IN); Naveen Chandra Tewari, Moradabad (IN); Rajarshi Bhose, Kolkata (IN)

(73) Assignee: Infosys Limited, Bangalore (IN)

( * ) Notice: Subject to any disclaimer, the term of this patent is extended or adjusted under 35 U.S.C. 154(b) by 248 days.

(21) Appl. No.: 13/554,615

(22) Filed: Jul. 20, 2012

(65) Prior Publication Data

US 2013/0191843 A1  Jul. 25, 2013

(30) Foreign Application Priority Data

Aug. 23, 2011  (IN) .................................. 2857/2011

(51) Int. Cl.
*G06F 9/46* (2006.01)
*G06F 9/50* (2006.01)

(52) U.S. Cl.
CPC .............. *G06F 9/505* (2013.01); *G06F 9/5066* (2013.01)

(58) Field of Classification Search
CPC ...... G06F 9/4881; G06F 9/5066; G06F 9/505
USPC .................. 718/103, 104, 105, 102
See application file for complete search history.

(56) References Cited

U.S. PATENT DOCUMENTS

| | | | | |
|---|---|---|---|---|
| 5,392,429 A | * | 2/1995 | Agrawal et al. | 708/446 |
| 6,223,205 B1 | * | 4/2001 | Harchol-Balter et al. | 718/105 |
| 8,276,148 B2 | * | 9/2012 | Cho et al. | 718/102 |
| 8,332,862 B2 | * | 12/2012 | Isard et al. | 718/104 |
| 8,695,009 B2 | * | 4/2014 | Vojnovic et al. | 718/104 |
| 2007/0214458 A1 | * | 9/2007 | Bansal et al. | 718/104 |
| 2011/0067030 A1 | * | 3/2011 | Isard et al. | 718/102 |
| 2011/0296052 A1 | * | 12/2011 | Guo et al. | 709/240 |
| 2012/0131128 A1 | * | 5/2012 | Aust et al. | 709/213 |
| 2013/0173666 A1 | * | 7/2013 | Qi et al. | 707/798 |

OTHER PUBLICATIONS

Isard et al. "Quincy: fair scheduling for distributed computing clusters", 2009, Proceedings of the ACM SIGOPS 22nd symposium on Operating systems principles, pp. 261-276.*
Jeffrey Dean et al., MapReduce: Simplified Data Processing on Large Clusters, Google, Inc., pp. 1-13, OSDI (2004).
Gerald Sabin et al., Scheduling of Parallel Jobs in a Heterogeneous Multi-Site Environment, The Ohio State University, Columbus, OH.

(Continued)

*Primary Examiner* — Emerson Puente
*Assistant Examiner* — Willy W Huarcha
(74) *Attorney, Agent, or Firm* — Marc S. Kaufman; Stephen M. Hertzler; Reed Smith LLP (57) ABSTRACT

A system and computer-implemented method for generating an optimized allocation of a plurality of tasks across a plurality of processors or slots for processing or execution in a distributed computing environment. In a cloud computing environment implementing a MapReduce framework, the system and computer-implemented method may be used to schedule map or reduce tasks to processors or slots on the network such that the tasks are matched to processors or slots in a data locality aware fashion wherein the suitability of node and the characteristics of the task are accounted for using a minimum cost flow function.

19 Claims, 4 Drawing Sheets

(56) References Cited

OTHER PUBLICATIONS

Ion Stoica et al., On the Duality between Resource Reservation and Proportional Share Resource Allocation, Multimedia Computing and Networking 1997, SPIE Proceedings Series, vol. 3020, San Jose, CA, Feb. 1997, pp. 207-214.

Jorda Polo, et al., Performance-Driven Task Co-Scheduling for MapReduce Environments, Barcelona Supercomputing Center (BSC), Technical University of Catalonia (UPC), Barcelona, Spain, IBM T.J. Watson Research Center, Hawthorne, NY.

Matei Zaharia, et al., Job Scheduling for Multi-User MapReduce Clusters, Electrical Engineering and Computer Sciences, University of California at Berkeley, Technical Report No. UCB/EECS-2009-55, Apr. 30, 2009.

Joe Elizondo et al., Edge-Based Cloud Computing as a Feasible Network Paradigm, Department of Computer Science University of Texas at Austin, pp. 1-8, Dec. 4, 2009.

* cited by examiner

SYSTEM AND METHOD FOR JOB SCHEDULING OPTIMIZATION

RELATED APPLICATION DATA

This application claims priority to Indian Patent Application No. 2857/CHE/2011, filed Aug. 23, 2011, which is hereby incorporated by reference in its entirety.

BACKGROUND

In a utility computing or cloud computing model, businesses and users are able to access application services from any location on demand and without regard to where the services are actually hosted. This provisioning of computing services is typically supported by disparately located data centers containing ensembles of networked Virtual Machines. Cloud computing delivers infrastructure, platform and software as services, which may be made available as subscription based services wherein payment is dependent upon actual usage. Multiple types of services are encompassed within cloud computing implementations, including Infrastructure as a Service (IaaS), Platform as a Service (PaaS), and Software as a Service (SaaS). Cloud computing application services include social networking and gaming portals, business applications, media content delivery and scientific workflows. In these instances, the amount of data can be significant, often ranging from terabytes to even petabytes of data. As user demands are unpredictable, and data may be located across disparate nodes in the cloud infrastructure, load balancing and scheduling in this distributed environment must be accomplished dynamically and in real-time.

The most prevalent distributed file system framework is MapReduce, originally designed by Google, Inc. to exploit large clusters to perform parallel computations. The MapReduce framework is used to support distributed computing on large data sets on clusters of computers, or nodes. The framework is composed of an execution runtime and a distributed file system, the Google File System (GFS). The runtime and the distributed file system provide a level of fault tolerance and reliability which are critical in a large-scale data environment. As is appreciated by those skilled in the art, there are two steps as part of a MapReduce framework: map and reduce. During the map step, a master node takes the input, chops it up into smaller sub-problems, and distributes those to worker nodes. A worker node may do this again in turn, leading to a multi-level tree structure. The worker node processes that smaller problem, and passes the answer back to its master node. During the reduce step, the master node then takes the answers to all the sub-problems and combines them in a way to get the output—the answer to the problem it was originally trying to solve.

There are various runtime implementations of the MapReduce framework; for example, the Apache™ Hadoop™ project. Hadoop™ is an open source MapReduce runtime provided by the Apache Software Foundation. It uses the Hadoop Distributed File System (HDFS) as shared storage, enabling data to be shared among distributed processes using files. Briefly, the HDFS implementation has a master/slave (or master/worker) architecture, wherein a master process ("NameNode") manages the global name space and controls operations on data and files. A slave process ("DataNode") performs operations on data blocks stored locally upon instruction from the NameNode. More specifically, the Hadoop™ runtime consists of two processes: "JobTracker" and "TaskTracker". JobTracker is a single instance process which partitions the input data ("job") into subsets ("tasks") as defined by the programmer. After the job has been split, JobTracker populates a local task queue based on the number of splits and distributes the tasks to TaskTrackers for distribution, computation or operation. If a TaskTracker becomes idle, the JobTracker picks a new task from its queue for processing. Thus, the granularity of the tasks has an immediate impact on the balancing ability of the scheduler, i.e., the greater the number/variance in size of tasks the greater complexity. Thus, the granularity of the splits has considerable influence on the balancing capability of the scheduler. Another consideration is the location of the data blocks, as the JobTracker tries to minimize the number of remote blocks accessed by each TaskTracker.

In this framework, the runtime is responsible for assigning and dispatching tasks to worker nodes and ensuring their completion. As is commonplace in the cloud computing field, submitted jobs may have significantly varying priorities and dependencies, e.g., low priority tasks requiring hours for completion, or interactive tasks requiring input from a second task execution. Task selection/scheduling of slave nodes directly impacts job performance and overall Quality of Service (QoS) of the system. Accordingly, it is to be appreciated that scheduling algorithms play a critical role in providing increased QoS in the cloud computing environment.

Several methods are well known in the art to provide scheduling of tasks. For example, "Fair Scheduler" provides a method of assigning resources to jobs such that all jobs get, on average, an equal share of resources over time. Briefly, when there is a single job running, that job uses the entire cluster. When other jobs are submitted, task slots that free up are assigned to the new jobs, so that each job gets roughly about the same amount of CPU time. Fair sharing may also work with job priorities—the priorities are used as weights to determine the fraction of total compute time that each job gets. Jobs in the Fair Scheduler are organized into pools, wherein resources are divided fairly between the pools and a minimum share size may be assigned to specified pools. Another method known in the art is the "Capacity Scheduler" which provides support for multiple job queues and guarantees a fraction of the capacity of the cluster to a queue. In this implementation, free resources can be allocated to any queue beyond its guaranteed capacity, but these excess allocated resources may be reclaimed and made available to another queue in ensure that all queues receive their capacity guarantee. This implementation further provides rules for managing greedy processes and providing priority jobs first access to a queue's resources. Both "Fair Scheduler" and "Capacity Scheduler" do not take into account the locality of the nodes, the local availability of relevant data on considered nodes, or the suitability of the node for the particular job.

Alternative scheduling methods have been proposed by those skilled in the art. For example, M. Zaharia, et al., "Job Scheduling for Multi-User MapReduce Clusters," Techn'l Rprt. UCB/EECS-2009-55, Univ. Berkley at Cal., propose two algorithms for the improvement of a FAIR scheduler, Delay Scheduling and Copy-Compute Splitting. Delay Scheduling attempts to achieve efficiency in MapReduce operations by running tasks on the nodes that contain their input, wherein if a node requests a task, and if the head-of-the-line job cannot launch a local task, the job is skipped and subsequent jobs are considered. In this method, if a job has been skipped for a specified length of time, then it may be launched as a non-local task in order to avoid starving the job. Copy-Compute Splitting attempts to address the problem of slot hoarding, i.e., the interdependence between reduce and map tasks, for large jobs, wherein a reduce operation begins copying map outputs while the remaining maps are still running However, in a large job having tens of thousands of map tasks, the map phase may take a long time to complete. That is, at any time a reduce slot is either using the network to copy map outputs or using the CPU to apply the reduce function, but not both. The Copy-Compute Splitting method splits reduce tasks into two logically distinct types of tasks: copy tasks and compute tasks, wherein the compute tasks are managed by an admission control system that limits the number of reducers computing at any time.

Also in the art, J. Polo et al., "Performance-driven task co-scheduling for MapReduce environments," IEEE/IFIP Network Operations and Management Symposium, 2010, propose a dynamic scheduler that estimates the completion time for each MapReduce job in the system, taking advantage of the fact that each MapReduce job is composed of a large number of tasks (maps and reduces) known in advance during the job initialization process (when the input data is split), and that the progress of the job can be observed at runtime. The scheduler takes each submitted and not yet completed job and monitors the average task length for already completed tasks. Based on these estimates, the scheduler is able to dynamically adapt the number of task slots such that each job is allocated. Another technique is provided by I. Stoca et al., "On the duality between resource reservation and proportional share resource allocation," In Proc. of Multimedia Computing and Networking, 2007, proposing a scheduler that characterizes jobs in terms of their weight, as is commonly used in proportional share allocation, and by their share, as is commonly used in resource reservation methods—as opposed to either parameter individually.

DETAILED DESCRIPTION

There is a need in the art for an efficient and data locality sensitive scheduling methodology and system in distributed computing environments. In a distributed file system, enormous files and/or related data blocks may be stored across multiple computers (or nodes. These data blocks, in turn, may be linked such that a reference is provided as to their location. Such implementations provide redundancy, fail-over reliability, as well as multiple points for local computation. For example, in the field of cloud computing, as is appreciated by those skilled in the art, data blocks may be stored across a cluster of nodes, wherein a computation or process may be executed on a node that does not have the relevant data locally stored. In such an instance, a cost may be associated with the delay in processing the data, delay in returning the completed computation to the requesting user or process, an increased I/O cost associated with the transfer of data between the computing node and the data store, or the financial overhead costs associated with processing non-local data, i.e., energy costs relating to the operation of disparate nodes and data transfer over geographic distances. In the cloud computing space, there may be hundreds (or even thousands) of nodes that may be called upon to process data and, in most instances, the computation requests must be scheduled in real-time. Thus, only a fraction of the total number of nodes in the distributed environment can have relevant data locally accessible and it is desirable to schedule tasks on such nodes.

In truly distributed environments, nodes may be globally placed, i.e., not located on a single or co-located collection of switches, within the same data center, or in the same country or continent. In such an environment, the data itself may be considered globalized. Thus, geographic location of a relevant node assumes a greater concern in achieving optimization. By way of example, a job scheduler in a distributed system, as described in the prior art, may potentially allocate different tasks of a given job to nodes which span the globe. This is made clear with regards to the prior art discussion of the Fair Scheduler, Capacity Scheduler, and I. Stoca et al.'s reservation and proportional share technique, wherein each is concerned with resource availability and/or process requirements, but do not focus on data locality in connection with the suitability of a particular node for a given task. Other scheduling techniques, such as J. Polo et al.'s performance-driven task co-scheduler require historical data concerning completed tasks to determine how to best schedule tasks to nodes, yet impose a limit on real-time operation and do not consider data locality. M. Zaharia et al. consider data locality, but implement a task delay technique that must be actively managed and/or monitored to avoid starvation of jobs. These scheduling methodologies fail to account for the inherent cost of a geographically distributed computing environment, wherein, for example, a MapReduce framework can be impacted both in terms of time to collect final results from tasks, network transmission delays and overhead energy costs. Accordingly, as is to be appreciated by those skilled in the art, a data locality aware scheduler that matches the suitability of a node to the characteristics of a task is desirable.

As discussed, the prior art describes the MapReduce framework as an exemplary means for executing jobs in a distributed environment and in a parallel manner. The prior art, however, fails to provide for an effective, efficient and data locality aware solution to the scheduling of map or reduce tasks across a distributed system or the scheduling of processes in a distributed data environment. Several methodologies for scheduling have been proposed by those skilled in the art, yet none address the specific constraints introduced by data locality issues in an effective manner. That is, the prior art does not consider the locality of a node and the suitability for a particular node for a particular job and/or task.

Various embodiments of the present invention will be described in detail with reference to the drawings. Reference to various embodiments does not limit the scope of the invention, which is limited only by scope of claims attached hereto. Additionally, any examples set forth in this specification are not intended to be limiting and merely set forth some of the many possible embodiments. Also, it is to be understood that the phraseology and terminology used herein is for the purpose of description and should not be regarded as limiting. The use of "including", "comprising", or "having" and variations thereof herein is meant to encompass the items listed thereafter and equivalents thereof as well as additional items.

Figure 1:
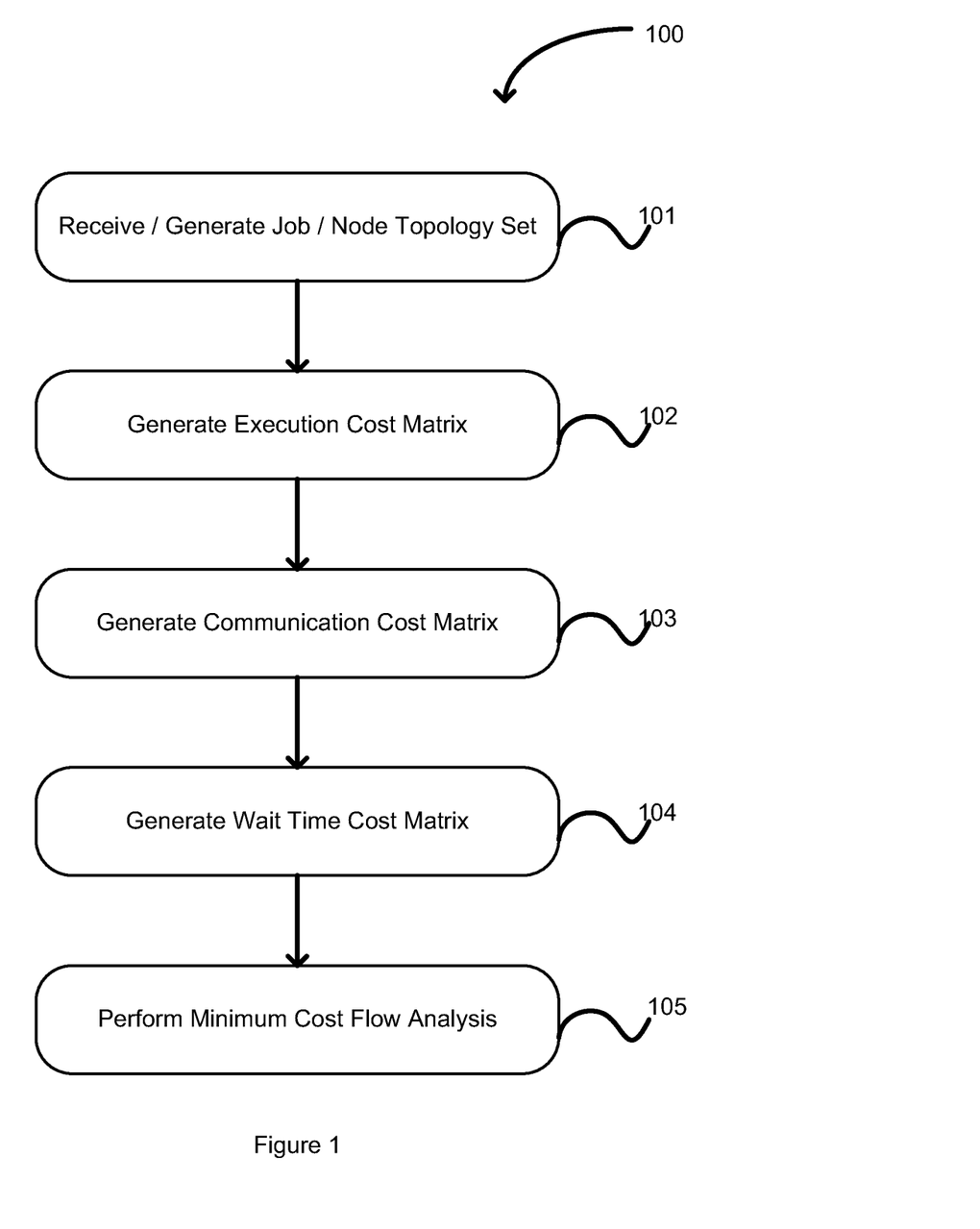
FIG. 1 is a functional flow block diagram of an exemplary system.

The disclosed embodiments are a method of allocating computation jobs comprising tasks to nodes in a distributed environment, wherein an optimization function provides a data locality aware result that matches the suitability of a node to the characteristics of a task. FIG. 1 depicts an overall view 100 of an embodiment. At Block 101, optimization parameters may be received and/or generated by the scheduler. As is understood by those skilled in the art, the optimization parameters may be provided by a separate process, a job tracker, a node topology mapping process, or any other appropriate means. Furthermore, at 101, the scheduler may, in an alternative embodiment, generate the relevant parameters based upon a user or process provided description of job characteristics and network topology. The parameters may be understood to include the relevant characteristics of the job to be processed, inclusive of the individual tasks comprising the job, as well as an accounting of the nodes (network topology and/or description of slots to be considered) to which the tasks may be individually assigned. The jobs may be understood to comprise a task set; for example, $T=\{t1, t2, \ldots, tn\}$, wherein t is an individual task and job(ti) denotes the identification of the corresponding job related to task ti. Each task in the task set may be understood to have a size; for example, $TS=\{ts1, ts2, \ldots, tsn\}$, wherein tsn denotes the task size of task tn. By way of non-limiting example, in an embodiment implemented in the Hadoop™ environment, task size may be obtained by the function getlength( ) from the HDFS infrastructure like Hadoop. Job and task parameters may further include priority level; for example, Pri_level[tn], wherein a priority level may range from "1" to "5" such that, by way of non-limiting example, a low priority task may be assigned a value of "1", whereas a high priority task may be assigned a value of "5". In alternative embodiments, other methodologies and scales for providing priority levels to tasks may be implemented, as is known in the art. For convenience of reference herein, it may be assumed that all tasks belonging to a particular job, i.e., T, have the same priority level and that the priority level is provided at the time of job creation prior to invocation of the scheduler. Note, however, that a job or an individual job may also have varying priority levels. By way of non-limiting example, the priorities can be provided by the submitter of the job. A further parameter to be received is an identification of all nodes (or processors or slots) that are present in the distributed file system and are available to the scheduler; for example, $S=\{s1, s2, \ldots, sm\}$, wherein S is the set of all available nodes, s. The identification of all nodes may be understood as the topology. As is appreciated by one skilled in the field of distributed systems, additional parameters describing the jobs, tasks or the nodes may be provided to the scheduler.

At Block 102, an execution cost matrix is generated, E[ti, sj], that is populated with the time to complete task ti to run on slot sj. In the case of a previously unscheduled task, E[ti, sj] provides the time required to run the unscheduled task on the slot. In the case of a currently executing task, E[ti, sj] provides the execution time remaining for that particular task. In an embodiment, all slots in a cluster may be homogeneous; that is, the configuration of the computers (or nodes) are similar or the same in capability and design. In such an embodiment, the execution time for an unscheduled or executing task may be computed as the average time taken for the previous task (belonging to the same job, Tj) to complete. In an alternative embodiment the slots in the cluster are heterogeneous, wherein the execution time for an unscheduled or executing task may vary from slot to slot such that data particular to the individual slot must be considered, wherein the slots may be categorized based on the history of previous job performance and hardware configuration. In an alternative embodiment, if the previous tasks were not executed on the considered slot, sj, then the estimation of time to complete a task may be based on time to complete on an alternative slot, sk, wherein the time to complete on the alternative slot is multiplied by the ratio of computing capability between the two slots, (sk/sj), as provided for by the history of previously executed tasks. The following is exemplary pseudo code for estimation of time to complete a first task, ti, on a first slot, sj, and for the case of computing the performance ratio of two slots.

```
/* Compute execution time E[task t_i,slot s_j]*/
    j= Job(t_i)          /*Find the corresponding Job j of the task t_i*/
    find the tasks corresponding to j in Comp_T[s_j], where
        Comp_T[s_j] is the set of completed tasks on slot s_j;
        if cluster has just been initialized, Comp_T[s] = φ
    if tasks corresponding to j in Comp_T[s_j] exist
        return the average completion time (avg_T) of retrieved tasks
    else
        for each slot s_k∈S
            find the tasks corresponding to j in Comp_T[s_k]
            if the tasks corresponding to j in Comp_T[s_k] exist
                compute average completion time (avg_T) of
                    retrieved tasks
                returnavg_T*performance_ratio (s_k|s_j).
    endif
/* Computing the performance ratio of two slots */
    performance_ratio (slot s_i, slot s_j)
    Comp_J_i = φ, Comp_J_j =φ. Where Comp_J_i is the set of completed
        jobs previously runned on slot s_i.
    for task t∈Comp_T[s_i]
        Comp_J_i = Comp_J_i ∪ job(t)
    end for
    for task t∈Comp_T[s_j]
        Comp_J_j = Comp_J_j ∪ job(t)
    end for
    Common_jobs = Comp_J_i∩ Comp_J_j/* find common jobs running
on both slots */
    Avg_time(s_i)=0;
    Avg_time(s_j)=0;
    for each job j_k ∈ Common_jobs
        avg_time_job(s_i)=0;
        no_tasks(s_i)=0;
        avg_time_job(s_j)=0;
        no_tasks(s_j)=0;
        for each task t_l ∈ j_k
            if t_l∈ Comp_T[s_i]
                avg_time_job(s_i)= avg_time_job(s_i)+
                    Comp_exec(t_l,s_i); /*where Comp_exec(t_l,s_i)
                    denote the time taken from task t_l on slot s_i
                no_tasks(s_i)=no_tasks(s_i)+1;
            endif
            if t_l∈ Comp_T[s_j]
                avg_time_job(s_j)= avg_time_job(s_j)+
                    Comp_exec(t_l,s_j);
                no_tasks(s_j)=no_tasks(s_j)+1;
            endif
        end for
        Avg_time(s_i)= Avg_time(s_i)+ avg_time_job(s_i)/ no_tasks(s_i)
        Avg_time(s_j)= Avg_time(s_j)+ avg_time_job(s_j)/ no_tasks(s_j)
    end for
    Return avg_time(s_i)/avg_time(s_j)
```

At Block 103, a communication cost matrix is generated, C[$t_i$, $s_i$, $s_j$], denoting total data communication cost is determined for task ti as the data transfer cost related to performing the task on slot sj. This step includes the determination of whether data relevant to the task at issue is locally accessible to the node being considered, as well as the time to transfer the task to a second node. Stated another way, the total cost of data communication is determined for task ti on a first slot, sj, to be transferred to a second slot, si. If data corresponding to task, ti, is not available locally to the processor corresponding to slot sj, then a boolean value noting unavailability is provided, i.e., "0". As is appreciated by one skilled in the art, this may be expressed as DT[ti, sj]: min (tsi/D(sj, sk)) where DA[ti, sj]=1. DA[ ] is a data availability matrix providing whether data corresponding to task ti is available locally on slot sj, D[ ] is a distance matrix providing the time taken to send one unit of data from a first slot, sj, to a second slot, sk, and DT[ ] is a data transfer cost matrix providing the time required to transfer data relating to task ti on slot sj. By way of non-limiting example, in an embodiment implemented in the Hadoop™ environment, data locality for a task may be obtained by the function getsplitlocation( ). The following is exemplary pseudo code for total data communication cost for a task, ti, on a slot, sj.

```
/* Compute Data Transfer time (DT[task t_i ,slot s_j]) */
get_local_proc= getsplitlocation(t_i) /*get the locality information of
task t_i*/
min = infinity            /* local variable*/
for each slot s_k∈S
    ifproc(s_k) ∈get_local_proc
        if min< (ts_i/ D(s_j, s_k))
            min = ts_i/ D(s_j, s_k))
        endif
    endif
endfor
returnmin
```

At Block 104, the wait time cost matrix $W[s_j]$, for a task, $t_i$, to run on a slot, $s_j$, is determined. That is, the time remaining for the currently executing task on a considered slot to complete execution and for the slot to be in a state to receive a new task assignment. In an embodiment, wait time for task $t_i$ to run on slot $s_j$ may be computed as the elapsed time remaining for the currently executing task on slot $s_j$. If, however, task $t_i$ is already running on slot then the wait time will be zero. The following is exemplary pseudo code for a determination of wait time.

```
/* Compute Wait time(W[slot s_j]) */
t= Curr_T[s_j]             /* get current running task on slot s_j */
return E[t, s_j]-running_time(t)
```

Figure 2:
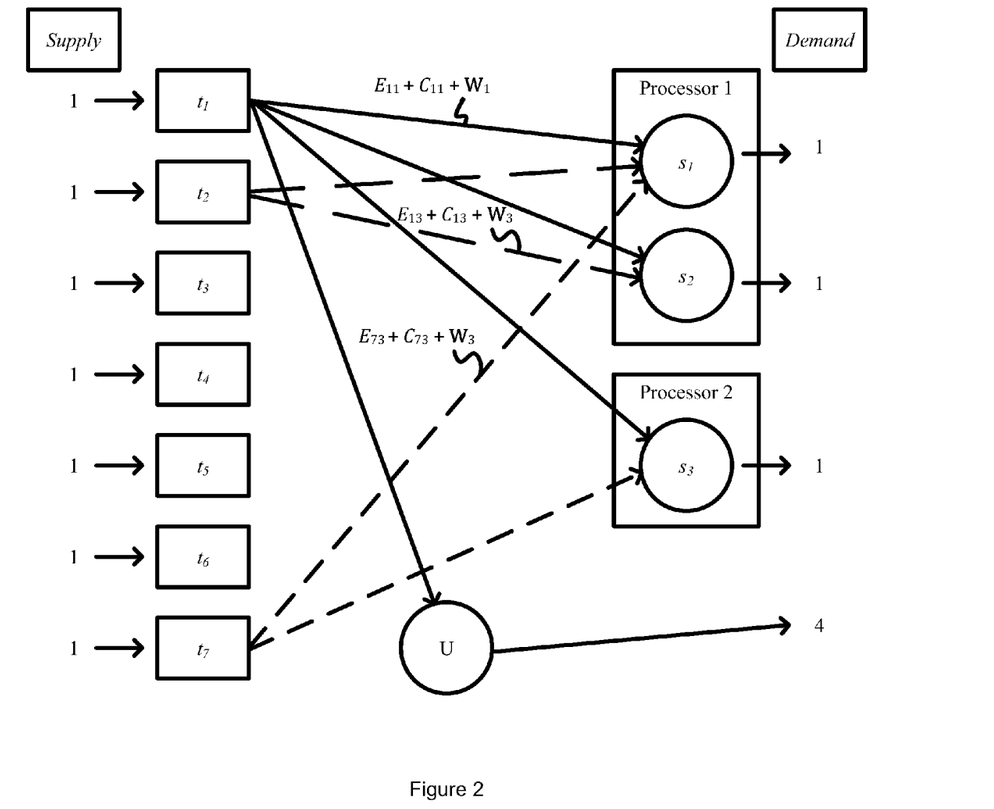
FIG. 2 is a bipartite graph of an exemplary system.

At Block 105, a minimum cost flow analysis is performed, wherein a bipartite graph or flow network is generated such that the set of tasks for a job, T, is matched with the set of available slots, S. Techniques of minimum cost flow, as described here-in, are well known in the art. See A. V. Goldberg, et al., "An Efficient Implementation of a Scaling Minimum Cost-Flow Algorithm," J. Algo., 22:1-29, 1997; A. Goldberg et al., "Solving Minimum-Cost Flow Problems by Successive Approximation," In Proc. of $19^{th}$ annual ACM symposium on Theory of Computing (STOC), 1987. A boolean task assignment matrix, $X[t_i, s_j]$, is populated, wherein $X[t_i, s_j]=1$ if a task $t_i$ has been assigned on a slot $s_j$. Upon assignment of a task, the resources (slots) are reserved. In an embodiment, a reserve task set may be provided wherein $RT[s_i]$ provides the tasks reserved to be executed on slot $s_i$. As is understood by those skilled in the art, given a flow network N(T, S), the total cost of the flow may be minimized using techniques known in the art, wherein N is a flow network having an origin, T, and a destination, S. Referring to FIG. 2, an exemplary bipartite graph is provided showing the edge weights between unscheduled tasks and the slots. In this embodiment, each task provides a supply of one unit to the system. Each supply unit may be allocated to a slot for fulfillment and each slot is capable of fulfilling one unit of supply in the system. In the case of unallocated remaining supplies in the system, these are allocated to the unscheduled node, U. It is to be understood that the cost of the edge from a task to the unscheduled node, U, is zero. Higher priority tasks are to be favored in the system such that they have a lower edge cost in comparison to lower priority tasks. In executing a feasible flow in the system, the flow from each task will go to either the slot nodes, S, or to the unscheduled node, U. For task assignment, if the flow for a task is provided to a slot node, then the task will be scheduled to that node. If the flow for a task is not provided to a slot node, then the task will not be scheduled. If the slot is currently empty, the scheduled task will be executed; however, if the slot is currently occupied by another task, then the scheduled task will be added to a reserve task list wherein $RT[s_i]$ provides the tasks to be executed on slot $s_i$ upon availability of the slot. As is understood by those skilled in the art, the optimization for scheduling tasks belonging to T may be expressed as:

$$\min \sum_{i=1}^{m} \sum_{j=1}^{n} (E[t_i, s_j] + \min_{k \in S} \{C[t_i, s_k, s_j] \times DA[t_i, s_k]\} + W(s_j)) \times X[t_i, s_j]$$

In an embodiment, certain constraints may be imposed on the optimization; for example, a task may only be executed on one slot, i.e., $$\sum_{j=1}^{n} X[t_i, s_j] \leq 1,$$

and that higher priority jobs must be executed first, i.e., $X[t_i, s_j]=1 \rightarrow \forall_{ks,t_kpri_{level[k]}^{<pri}{}_{level[i]}} X[t_k,s_j]=1$. In an embodiment, the following exemplary pseudo code may be used to schedule tasks, as described above.

```
/* graph creation */
graph_creation(Tasks T, Slots S)
    create a bipartite graph between tasks T and Slot S.
    for each slot s_j
        compute Wait Time W[s_i] needed to free the slot.
    for each task t_i and Slot s_j
        compute Execution Time E[t_i , s_j], Data Transfer Time DT[t_i, s_j].
        assign E[t_i ,sj]+ DT[t_i , s_j]+ W[i] as cost to edge between t_i and s_j
        end if
    end for
    normalize all edge costs to [0,1].
    for each task t_i and slot s_j        /*assign priority levels*/
        add pri_level(t_i) to the cost of edge between t_i and s_j
    for each task t_i add supply of 1 unit.
    for each slot s_j add demand of 1 unit
    create an unscheduled node U
    for each task t_i create an edge from t_i to U as cost zero
    for unscheduled node U add demand = (no_of_tasks –no_of_slots)
/* Solve the optimization function using min cost flow*/
Min_cost_flow
    add Source and sink in the graph.
    add edges from source to all the tasks T with flow equal to task
        supply and cost equal to zero
    add edges from slots S and node U to sink with flow equal to slot
        demand
    compute the max flow in the graph
    find the negative cost cycles in the residual graph
    while negative cost cycles exist in the residual graph
        update the graph by the flow corresponding to negative cost
            cycle
    return
/* Schedule assignments*/
Schedule(slot s_j, Task T)
    if RT[s_j] exist, Return RT[s_j] and update RT[s_j]=φ
    T_graph=Preparelist_task (S,T)
    S_graph=Preparelist_slot (S)
    graph_creation(Tasks T_graph, slot S_graph )     /* create the flow
        graph */
    compute min_cost_flow
    for each task t_i and slot s_j    /* finding the optimal solution X */
        if flow on edge between t_i and s_j is 1, X[t_i, s_j]=1
            else X[t_i, s_j]=0
    for each task t_i and slot s_j   /* task assignment and resource
        reservation*/
        ifX[t_i, s_j]=1
            ifcurr_T[s_j] =φ, then assign t_i to s_j by giving the
                information to hadoop scheduler
                else update RT[s_j] = t_i
        end if
    end for
    return RT
```

In the above exemplary pseudo code, the schedule assignments portion is executed when a slot is capable of receiving a task.

In a first alternative embodiment, a scheduler is required to schedule a task for a slot. In scheduling the task to the slot, the task is assigned to the slot and tasks are scheduled for other slots in the Reserve Task set, RT. In this instance, because RT is computed based on the minimization of the optimization function, selection of a task for a particular slot is already optimized based on locality considerations. Thus, the optimal task for a particular slot is "ready" or otherwise in queue for execution upon availability of the slot. This implementation significantly reduces the time required to schedule tasks because the next task for a slot has already been determined and is queued in RT. In a second alternative embodiment, the initial RT set which was calculated is discarded and the minimization of optimization function is repeated to map unscheduled tasks and unscheduled slots. This embodiment provides an optimal assignment based on current tasks available. In a further alternative embodiment, the RT set is considered, wherein only slots having an empty RT and unreserved tasks are considered while repeating the minimization of the optimization function. This embodiment provides partially optimal solution in the case that no new jobs are being scheduled or otherwise entering the system and causes the complexity of the solution to be lower due a fewer number of slots and tasks being considered. Further, this embodiment is ideal for scalable configurations wherein a large number of nodes are being considered, e.g., hundreds or thousands of nodes. In the case of discarding the previous RT, an optimal solution is provided, but at the cost of increased complexity. Implementation of a look-back versus non-look back process with respect to RT is dependent upon the total number of nodes being considered. The following exemplary pseudo code may be used to schedule tasks, as described above.

```
/* Prepare the tasklist and slot for the graph creation*/
//case1 ( Ignore the previous RT)
Preparelist_task (S,T)
Tunsched_list=φ
    for task ti∈ T
        Status_ti =0
        for slot sj∈ S
            if ti=curr_T[sj]
                Status_ti=1
            endif
        endfor
        if Status_ti =1
            Tunsched_list= Tunsched_list ∪ Ti
    endfor
return Tunsched_list
Preparelist_slot (S)
return S;
//case2 (considers previous RT)
Preparelist_task (S,T)
Tunreserved_list=φ
    for task ti∈ T
        Status_ti =0
        for slot sj∈ S
            if ti=curr_T[sj] or ti=_RT[sj]
                Status_ti=1
            endif
        endfor
        if Status_ti =1
            Tunreserved_list = Tunreserved_list ∪ ti
    endfor
return Tunreserved_list
Preparelist_slot (S)
Sunreserved =φ
    for slot si ∈ S
        if RT[si]= φ
            Sunreserved= Sunreserved ∪ si
        endif
    endfor
return Sunreserved
```

An embodiment of the invention, as applied to a cloud computing architecture implementing Hadoop™ and the MapReduce framework, the task set T may include either map ( ) or reduce ( ) operations. In the case of both types of operations, data managing, computing and copying operations can achieve significant increases in efficiency (both in terms of data locality and data transfer cost).

Figure 3:
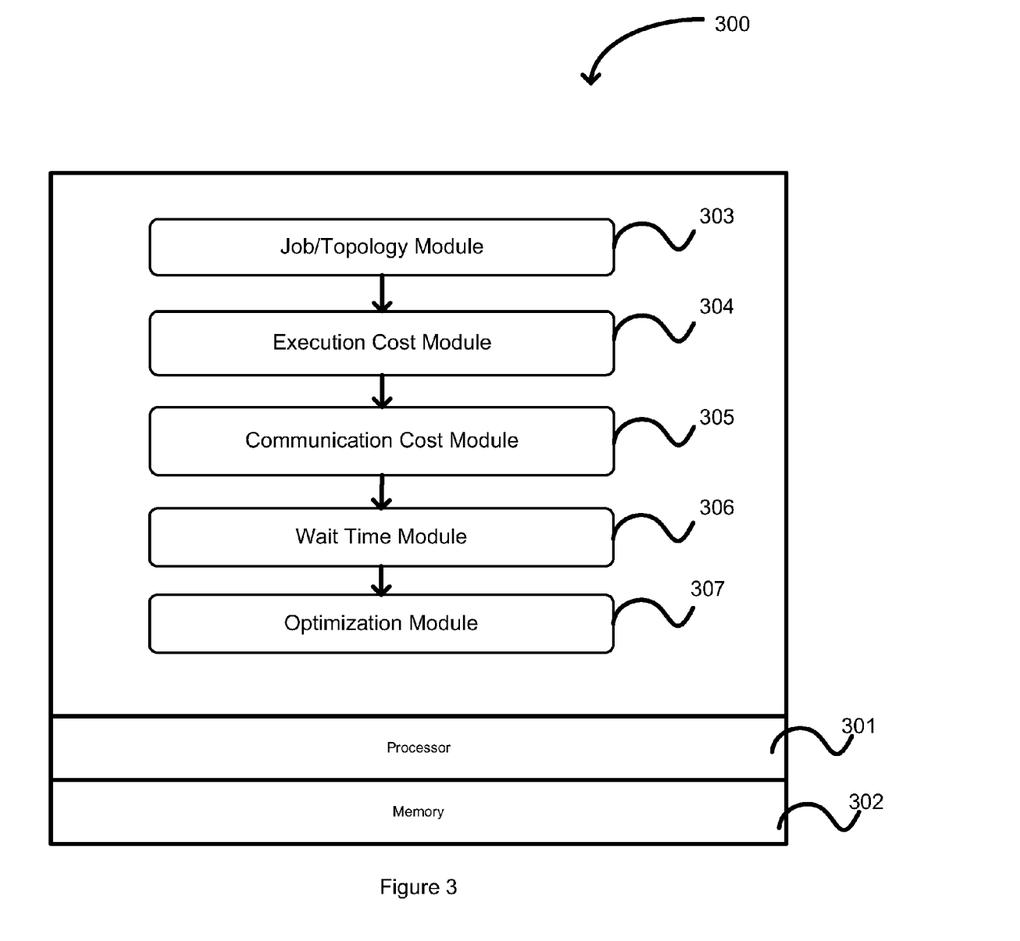
FIG. 3 is a functional flow block diagram of an exemplary system.
Figure 4:
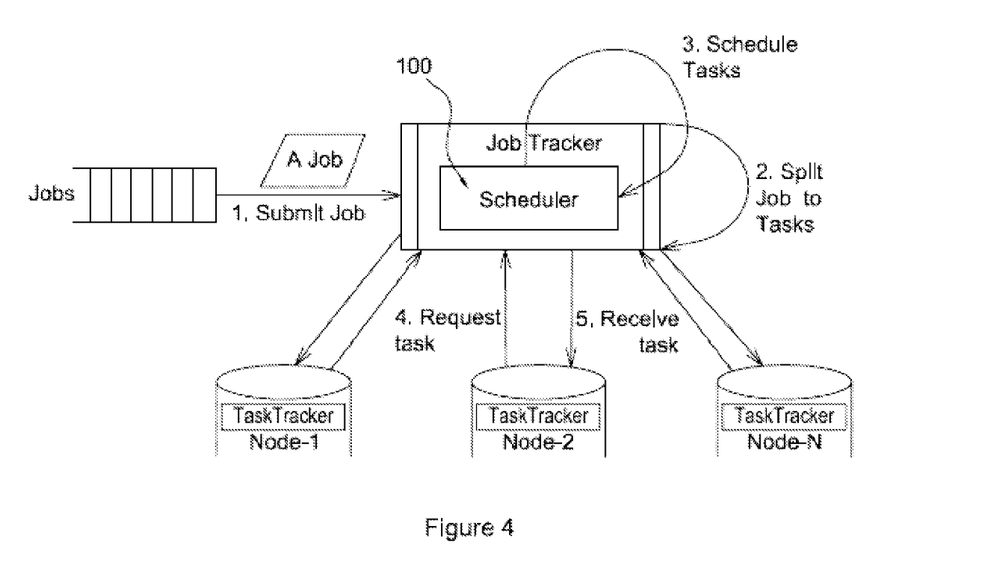
FIG. 4 is a functional flow block diagram of an exemplary system implemented in the Hadoop™ environment.

Referring to FIG. 3, a further embodiment 300 may include a computer having at least a processor 301 and memory 302, a Job/Topology Module 303, an Execution Cost Module 304, a Communication Cost Module 305, a Wait Time Module 306 and an Optimization Module 307. Job/Topology Module 303 may comprise a job or task list, or a queue of processes which are previously defined, dynamically generated or conveyed to the module via a user or device via any appropriate means as is understood in the art. The module 303 may further comprise a description, link or representation of a collection of processors, executors or any other means of representing a relevant topology as is understood in the art. The module 303 may further perform in accordance with the embodiments of block 101, discussed herein. The Execution Cost Module 304, Communication Cost Module 305, Wait Time Module 306, and Optimization Module 307 may perform in accordance with the embodiments of blocks 102, 103, 104 and 105, respectively, as described herein. The Optimization Module 307 may further include a means for communicating its scheduling functions and optimization results to a network manager or any other means for executing its optimization of tasks and nodes as is known in the art.

The various modules consist of computer software code recorded on computer readable media and executed by a processor. The modules are segregated by function in this description for the purpose of clarity of description, but need not be discrete devices or code portions. The modules can be segregated or integrated in any manner. Various computer devices can be used to implement the embodiments, such as Servers, PCs, laptop computers, tablets, handheld computing devices, mobile devices or various combinations of such devices.

Application of the embodiments is not limited to the MapReduce, Hadoop™ or even the cloud computing context. Instead, as is appreciated by those skilled in the art, the disclosed embodiments may be applied to any distributed environment as appropriate. The embodiments described herein may be implemented via any appropriate computing environment, as understood y those skilled in the art. Further, the embodiments, in the cloud computing environment, may interface with application managers, or other software and interfaces, hardware or any other appropriate means for identifying a plurality of tasks and a plurality of nodes and/or for executing a plurality of tasks on a plurality of nodes.

What is claimed is:

1. A computer system for optimizing the scheduling of a plurality of tasks to be executed on a plurality of nodes, the system comprising:
    a memory storing computer executable instructions; and
    a processor operatively coupled to said memory and configured to execute the instructions to perform the following steps:
        receive a plurality of tasks to be scheduled across a plurality of nodes;

populate an execution cost matrix with an amount of time to complete a first task of the plurality of tasks to run on a first node of the plurality of nodes;

determine whether data relevant to the first task is locally accessible to the first node;

determine an amount of time to transfer the first task to a second node of the plurality of nodes;

determine an amount of time remaining for the first task to complete execution by the first node and for the first node to be in a state to receive a second task of the plurality of tasks;

perform optimization using an optimization function that provides a data locality aware result based at least in part on the determinations; and schedule the first task to one of the first and second nodes based on the provided data locality aware result.

2. The system of claim 1, wherein the processor maintains a reserve task list for each node causing an optimally assigned task to be scheduled for immediate execution upon the availability of the node.

3. The system of claim 1, wherein the computer causes the generation of a bipartite graph between the plurality of tasks and the plurality of nodes, wherein the edge weight between the first task and a node is the total time for completion where the first task is assigned to the node.

4. The system of claim 3, wherein the computer causes a task having a higher priority to have a lower edge weight than a lower priority task.

5. The system of claim 3, wherein the bipartite graph includes an unscheduled node.

6. The system of claim 1, wherein, if data corresponding to the first task is not available locally to the first node, then the processor provides a Boolean value noting unavailability.

7. The system of claim 1, wherein the processor is configured to execute the instructions to perform the following steps:

generate a wait time cost matrix for the first task to run on the first node; and generate one of a bipartite graph and a flow network such that a set of tasks for a job is matched with a set of available nodes.

8. A non-transitory computer readable medium having stored thereon data representing sequences of instructions, which when executed by at least one computing device, cause the at least one computing device to:

receive a plurality of tasks to be scheduled across a plurality of nodes;

populate an execution cost matrix with an amount of time to complete a first task of the plurality of tasks to run on a first node of the plurality of nodes;

determine whether data relevant to the first task is locally accessible to the first node; and determine an amount of time to transfer the first task to a second node of the plurality of nodes;

determine an amount of time remaining for the first task to complete execution by the first node and for the first node to be in a state to receive a second task of the plurality of tasks;

perform optimization using an optimization function that provides a data locality aware result based at least in part on the determinations; and schedule the first task to one of the first and second nodes based on the provided data locality aware result.

9. A computer-implemented method for determining the scheduling of plurality of tasks across a plurality of nodes, comprising the steps of:

receiving, by a computing device, a plurality of tasks to be scheduled across a plurality of nodes;

populating, by a computing device, an execution cost matrix with an amount of time to complete a first task of the plurality of tasks to run on a first node of the plurality of nodes;

determining, by a computing device, whether data relevant to the first task is locally accessible to the first node; and determining, by a computing device, an amount of time to transfer the first task to a second node of the plurality of nodes;

determining, by a computing device, an amount of time remaining for the first task to complete execution by the first node and for the first node to be in a state to receive a second task of the plurality of tasks;

performing optimization using an optimization function that provides a data locality aware results based at least in part on the determinations; and scheduling, by a computing device, the first task to one of the first and second nodes based on the provided data locality aware result.

10. The computer-implemented method of claim 9, further including the step of maintaining a reserve task list for each node causing an optimally assigned task to be scheduled for immediate execution upon the availability of the node.

11. The computer-implemented method of claim 9, the optimizing step comprises the step of generating a bipartite graph between the plurality of tasks and the plurality of nodes, wherein the edge weight between the first task and a particular node is the total time for completion where the first task is assigned to the particular node.

12. The computer-implemented method of claim 11, wherein the optimizing step provides a lower edge weight to a task having a higher priority than a lower priority task.

13. The computer-implemented method of claim 11, wherein the optimizing step includes an unscheduled node in the generated bipartite graph.

14. The computer-implemented method of claim 9, further comprising the step of:

implementing, by a computing device, an optimization function for scheduling tasks by executing the following calculation:

$$\min \sum_{i=1}^{m} \sum_{j=1}^{n} (E[t_i, s_j] + \min_{k \in S} \{C[t_i, s_k, s_j] \times DA[t_i, s_k]\} + W(s_j)) \times X[t_i, s_j]$$

wherein t denotes an individual task, s denotes a node, $E[t_i, s_j]$ denotes an execution cost matrix, $C[t_i, s_k, s_j]$ denotes a communication cost matrix, $DA[t_i, s_k]$ denotes a data availability matrix, $W(s_j)$ denotes a wait time cost matrix, and $X[t_i, s_j]$ denotes a Boolean task assignment matrix.

15. A computer system for optimizing the scheduling of a plurality of tasks to be executed on a plurality of nodes, the system comprising:

a memory storing computer executable instructions; and a processor operatively coupled to said memory and configured to execute the instructions to perform the following steps:

receive a plurality of tasks to be scheduled across a plurality of nodes;

generate a communication cost matrix;

determine whether data relevant to a first task of the plurality of tasks is locally accessible to a first node of the plurality of nodes;

determine an amount of time to transfer the first task to a second node of the plurality of nodes;

implement an optimization function for scheduling tasks by executing the following calculation:

$$\min \sum_{i=1}^{m} \sum_{j=1}^{n} (E[t_i, s_j] + \min_{k \in S} \{C[t_i, s_k, s_j] \times DA[t_i, s_k]\} + W(s_j)) \times X[t_i, s_j]$$

wherein t denotes an individual task, s denotes a node, $E[t_i, s_j]$ denotes an execution cost matrix, $C[t_i, s_k, s_j]$ denotes a communication cost matrix, $DA[t_i, s_k]$ denotes a data availability matrix, $W(s_j)$ denotes a wait time cost matrix, and $X[t_i, s_j]$ denotes a Boolean task assignment matrix; and schedule the first task to one of the first and second nodes based on a data locality aware result provided by the optimization function.

16. The system of claim 15, wherein the processor maintains a reserve task list for each node causing an optimally assigned task to be scheduled for immediate execution upon the availability of the node.

17. The system of claim 15, wherein the computer causes the generation of a bipartite graph between the plurality of tasks and the plurality of nodes, wherein the edge weight between the first task and a particular node is the total time for completion where the first task is assigned to the particular node.

18. The system of claim 17, wherein the computer causes a task having a higher priority to have a lower edge weight than a lower priority task.

19. The system of claim 17, wherein the bipartite graph includes an unscheduled node.

* * * * *